US010551949B2

(12) United States Patent
Chai et al.

(10) Patent No.: US 10,551,949 B2
(45) Date of Patent: Feb. 4, 2020

(54) DISPLAY INTEGRATED ANTENNA (71) Applicant: Intel Corporation, Santa Clara, CA (US)

(72) Inventors: Mei Chai, Portland, OR (US); Kunjal Parikh, San Jose, CA (US); Bryce D. Horine, Portland, OR (US); Thomas Agung Nugraha, Tokyo (JP); Kwan Ho Lee, Mountain View, CA (US); Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 14/751,707

(22) Filed: Jun. 26, 2015

(65) Prior Publication Data
US 2016/0328057 A1    Nov. 10, 2016

Related U.S. Application Data (60) Provisional application No. 62/158,942, filed on May 8, 2015, provisional application No. 62/158,842, filed on May 8, 2015.

(51) Int. Cl.
G06F 3/041     (2006.01)
H01Q 13/10    (2006.01)

(52) U.S. Cl.
CPC .. *G06F 3/0412* (2013.01); *G06F 2203/04103* (2013.01); *H01Q 13/10* (2013.01)

(58) Field of Classification Search
CPC .................................................. G06F 3/0412
See application file for complete search history.

(56) References Cited

U.S. PATENT DOCUMENTS

| 6,362,786 | B1 * | 3/2002 | Asano ................... G06F 1/1616 343/700 MS |
| 6,452,549 | B1 * | 9/2002 | Lo ............................ H01Q 9/28 343/700 MS |
| 6,480,170 | B1 * | 11/2002 | Langley ................ H01Q 1/1271 343/700 MS |
| 9,104,263 | B2 * | 8/2015 | Peng ...................... G06F 3/0416 |
| 9,652,073 | B2 * | 5/2017 | Lim .......................... H01Q 1/36 |
| 2004/0183788 | A1 | 9/2004 | Kurashima et al. |
| 2007/0069971 | A1 * | 3/2007 | Horikoshi ................ H01Q 1/36 343/897 |

(Continued)

FOREIGN PATENT DOCUMENTS

| CN | 102804106 A | 11/2012 |
| CN | 103309513 A | 9/2013 |

(Continued)

OTHER PUBLICATIONS

Hecht et al, Emerging Transparent Electrodes based on Thin Films of Carbon Nanotubes, Graphene, and Metallic Nanostructures, Advanced Materials, 2011, pp. 1482-1513, (Year: 2011).*

(Continued)

*Primary Examiner* — Dorothy Harris
(74) *Attorney, Agent, or Firm* — Schiff Hardin LLP (57) ABSTRACT A touch panel for a display, the touch panel having a touch sensor configured to receive touch input, and an antenna located within or below the touch sensor.

19 Claims, 12 Drawing Sheets

(56) References Cited

U.S. PATENT DOCUMENTS

| | | | | |
|---|---|---|---|---|
| 2008/0028377 | A1* | 1/2008 | Dembo | G06F 9/4484 717/144 |
| 2008/0030424 | A1* | 2/2008 | Muraoka | H01Q 1/38 343/897 |
| 2008/0266183 | A1* | 10/2008 | Takei | H01Q 1/2208 343/700 MS |
| 2009/0051620 | A1* | 2/2009 | Ishibashi | H01Q 1/243 343/897 |
| 2009/0167699 | A1* | 7/2009 | Rosenblatt | G06F 3/044 345/173 |
| 2010/0309162 | A1* | 12/2010 | Nakanishi | G06F 3/044 345/174 |
| 2010/0321325 | A1* | 12/2010 | Springer | G06F 3/041 345/174 |
| 2011/0005808 | A1* | 1/2011 | White | H01B 1/026 174/126.2 |
| 2011/0095990 | A1* | 4/2011 | Philipp | G06F 3/044 345/173 |
| 2011/0096465 | A1* | 4/2011 | Zhou | H01B 1/04 361/502 |
| 2011/0267311 | A1* | 11/2011 | Yeh | G06F 1/1698 345/174 |
| 2011/0298670 | A1* | 12/2011 | Jung | H01Q 1/243 343/702 |
| 2012/0086669 | A1* | 4/2012 | Kim | G06F 3/044 345/174 |
| 2012/0092284 | A1 | 4/2012 | Rofougaran et al. | |
| 2012/0094594 | A1* | 4/2012 | Rofougaran | G06F 1/1626 455/15 |
| 2012/0162032 | A1* | 6/2012 | Yang | H01Q 1/2266 343/720 |
| 2013/0162594 | A1 | 6/2013 | Paulsen et al. | |
| 2013/0181937 | A1 | 7/2013 | Chen et al. | |
| 2013/0196596 | A1* | 8/2013 | Parekh | G06F 1/1643 455/41.1 |
| 2013/0264390 | A1* | 10/2013 | Frey | H01Q 1/2225 235/492 |
| 2013/0341409 | A1* | 12/2013 | Wu | G06K 19/07773 235/492 |
| 2014/0106684 | A1* | 4/2014 | Burns | H01Q 1/243 455/78 |
| 2014/0354906 | A1* | 12/2014 | Wu | G06F 3/041 349/12 |
| 2015/0185928 | A1* | 7/2015 | Son | G06F 3/016 345/174 |
| 2017/0139520 | A1* | 5/2017 | Yeh | G06F 3/0416 |

FOREIGN PATENT DOCUMENTS

| | | |
|---|---|---|
| CN | 104485983 A | 4/2015 |
| EP | 2403064 A1 | 1/2012 |

OTHER PUBLICATIONS

Song et al, Stretchable and Reversibly Deformable Radio Frequency Antennas based on Silver Nanowires, ACS Publications, 2014, pp. 4248-4253, (Year: 2014).*

Ahmed-Liyakath, Reconfigurable Antenna and RF Circuits Using Multi-Layer Stretchable Conductors, Graduate Theses and Dissertation, 2012, pp. 1-106, (Year: 2012).*

Lee et al, Carbon-Nanotube Loaded Antenna-Based Ammonia Gas Sensor, IEEE, 2011 pp. 2065-2673, (Year: 2011).*

Stapelton et al, Highly conductive interwoven carbon nanotube and silver nanowire transparent electrodes, National Institute for Materials Science, 2013, pp. 1-8, (Year: 2013).*

Patel, Nanotube RFID Better Barcodes? Intelligent machines, 2010, pp. 1-5. (Year: 2010).*

Extended European Search Report dated Nov. 2, 2016 for European Ptent Application No. 16164128.7.

Office Action dated Jun. 6, 2018 for Chinese Application No. 201610203740.4.

* cited by examiner

Figure 2A

114X
X Electrode Layer

Figure 2B

114Y
Y Electrode Layer

DISPLAY INTEGRATED ANTENNA

RELATED APPLICATIONS

This patent application claims priority to U.S. Provisional Patent Application No. 62/158,842, filed May 8, 2015, entitled "Display Integrated Micro Wire Antenna," and U.S. Provisional Patent Application No. 62/158,942, filed May 8, 2015, entitled "Display Integrated Transparent Antenna Into Touch Sensor Layers," both of which are incorporated herein by reference in their entireties.

TECHNICAL FIELD

The present disclosure generally relates to an antenna, and more specifically, to an antenna that is integrated into a touch panel display.

BACKGROUND

Wireless communication devices, such as mobile phones and tablets, ideally have an edge-to-edge bezel-less display. At the same time, the number of wireless communication protocols (e.g., Wi-Fi, 3G/4G/LTE, FM, etc.) that need to be supported and the related antennas is increasing. Typically antennas are hidden in the bezel surrounding the display. As displays become closer to being bezel-less, a different antenna location is desired.

DETAILED DESCRIPTION

The present disclosure is directed to a touch panel for a display, the touch panel having a touch sensor configured to receive touch input, and an antenna located within or below the touch sensor. The antenna is integrated in the touch panel without compromising the touch sensitivity or the optical quality of the display.

Figure 1A:
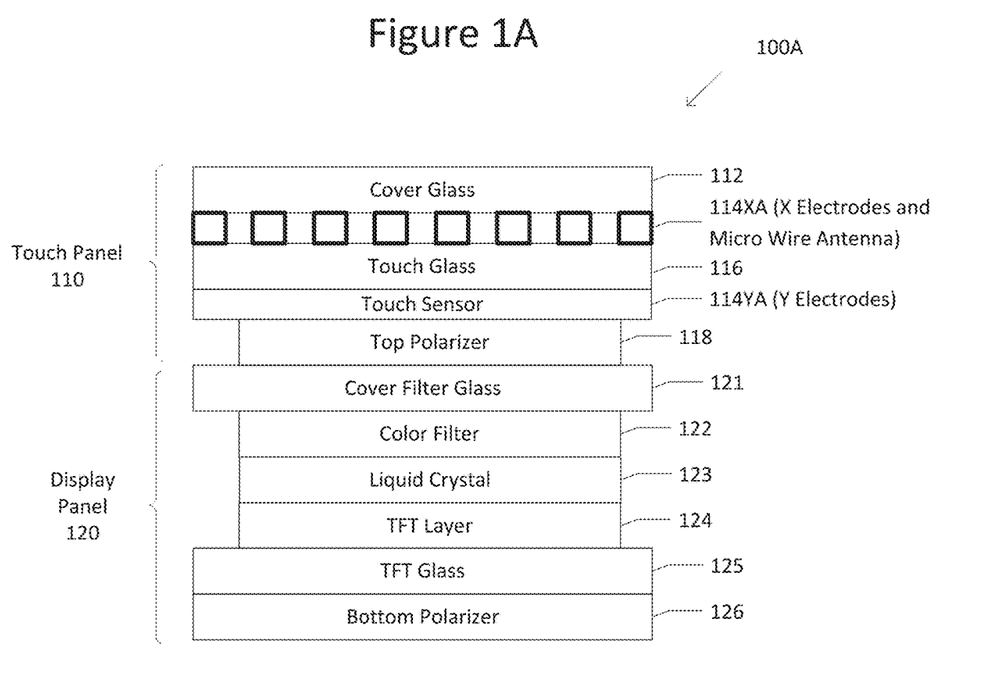
FIG. 1A illustrates a schematic side view diagram of a stack of components of a touch panel display in accordance with one aspect of the disclosure.

FIG. 1A illustrates a schematic side view diagram of a stack of components of a touch panel display 100A in accordance with one aspect of the disclosure. The components, in exaggerated dimension, comprise a stack of components of the touch panel display 100A such as a panel display for a mobile phone or tablet. The touch panel display 100A comprises a touch panel 110 and a display panel 120.

The touch panel 110 comprises a cover glass 112, a two-layer touch sensor 114 (114XA and 114YA), a touch glass 116, and a top polarizer 118. The touch sensor 114 has in layer 114XA X electrodes, and in layer 114YA Y electrodes. These components of the touch panel 110 are known, and thus for the sake of brevity their individual descriptions will not be provided here.

The touch sensor 114 is based on Projected Capacitive Touch (PCT). The touch sensor 114 is made up of a matrix of sense electrode columns 114X (X electrodes) and drive electrode rows 114Y (Y electrodes) of conductive material, layered on sheets of glass. The drive electrode rows 114Y are spaced apart from the sense electrode columns 114X. The drive electrode rows 114Y generate an electric field and the sense electrode rows 114X receive the electric field. Overlapping portions of the drive electrode rows 114Y and sense electrode columns 114X form respective capacitors. When a conductive object, such as a finger or other contacting device (e.g., stylus), comes into contact with the overlapping portions, the local electrostatic field becomes distorted at that point and grounds the respective capacitor. The variations of capacitance can be changed and measured at every overlapping portion of the matrix.

The sense electrode columns 114X (X electrodes) and drive electrode rows 114Y (Y electrodes) can comprise indium tin oxide (ITO) transparent conductor, micro wire metal mesh, and/or one or more other materials as suitable for the intended purpose. The electrode columns and rows may be more generally known as electrode traces, and the terms columns and rows are not meant to be limiting. Further, the disclosure is not limited to PCT, but may be any touch panel technology as suitable for the intended purpose.

The display panel 120, which is located under the touch panel 110, comprises a cover filter glass 121, a color filter 122, liquid crystal 123, thin film transistor (TFT) layer 124, TFT glass 125, and bottom polarizer 126. These components of the display panel 120 are known, and thus for the sake of brevity their individual descriptions will not be provided here.

The micro wire antenna is located in the same layer as the touch sensor 114, but at different locations in the layer than where the electrodes are located. In the case shown in FIG. 1A the micro wire antenna is located in the X sensor layer 114XA of the touch sensor 114, as opposed to the Y sensor layer 114YA. The micro wire antenna may be a slot antenna, dipole antenna, or monopole antenna, or any other antenna that is one layer and is suitable for the intended purpose. A slot antenna, for example, is generally a solid sheet of copper; a micro wire slot antenna has a same basic design but is comprised of micro wire mesh. The antenna is connected by a feed. The feed is not transparent, so a transparent extension may be used. Options for connecting the feed include coplanar waveguide (CPW) and pogo pin.

Figure 1B:
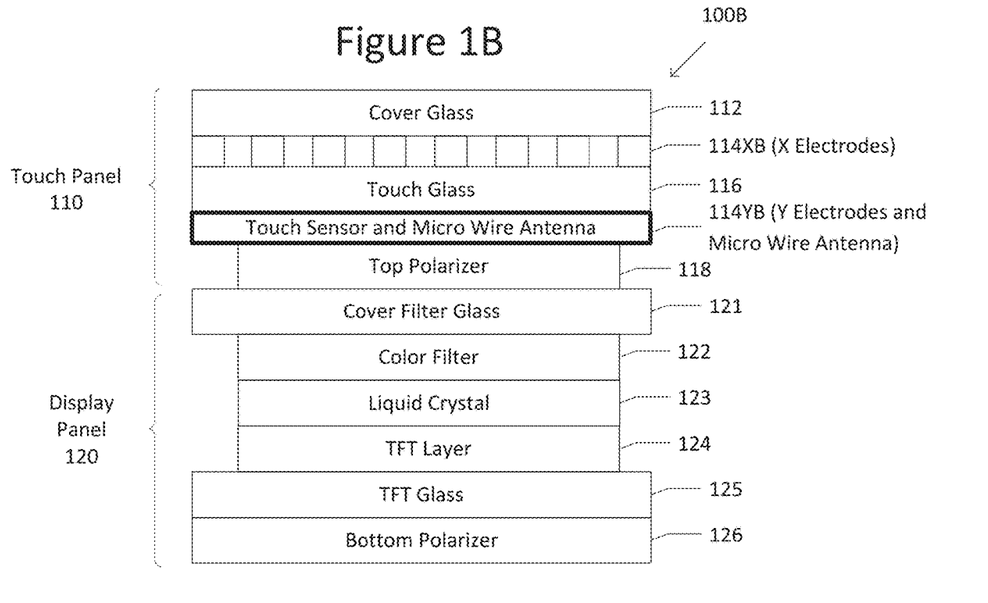
FIG. 1B illustrates a schematic side view diagram of a stack of components of a touch panel display in accordance with another aspect of the disclosure.

FIG. 1B illustrates a schematic side view diagram of a stack of components of a touch panel display 100B in accordance with another aspect of the disclosure. The touch panel display 100B of FIG. 1B is similar to that of FIG. 1A, except that the micro wire antenna is located in layer 114YA with the Y electrodes of the touch sensor 114 rather than the layer 114XA with the X electrodes.

Figure 1C:
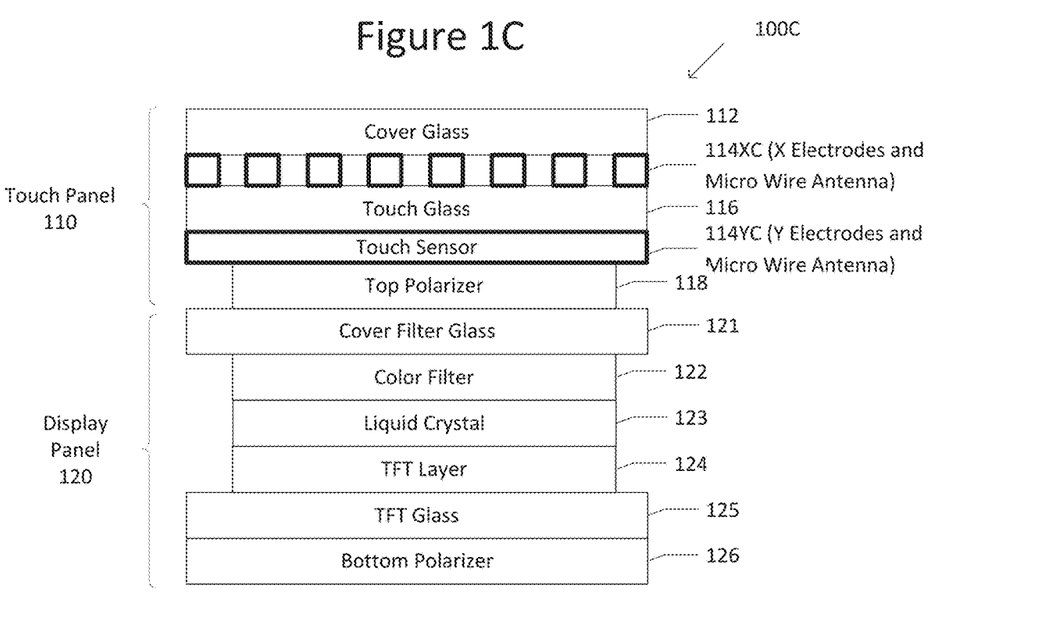
FIG. 1C illustrates a schematic side view diagram of a stack of components of a touch panel display in accordance with another aspect of the disclosure.

FIG. 1C illustrates a schematic side view diagram of a stack of components of a touch panel display 100C in accordance with another aspect of the disclosure. The touch panel display 100C of FIG. 1C is similar to that of FIG. 1A, except that the micro wire antenna is located in both layer 114XA with the X electrodes and layer 114YA with the Y electrodes of the touch sensor. The micro wire antenna of this aspect of the disclosure may be a patch antenna, or any other antenna that is comprised of two layers and suitable for the intended purpose.

Figures 2A, 2B:
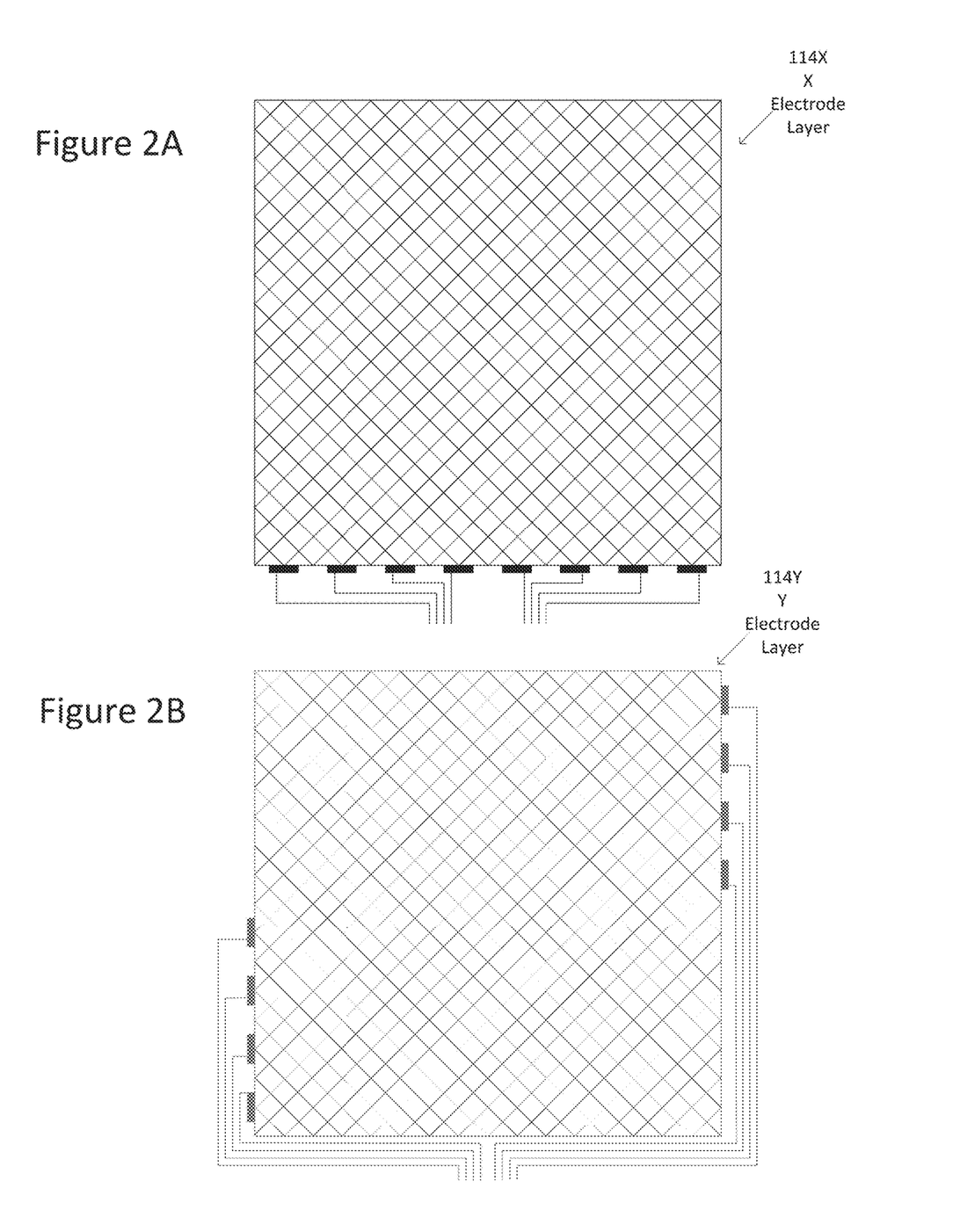
FIG. 2A illustrates a schematic plan view diagram of an X sensor layer of the touch panel displays of any of FIGS. 1A-1C.
FIG. 2B illustrates a schematic plan view diagram of a Y sensor layer of the touch panel displays of any of FIGS. 1A-1C
Figure 2C:
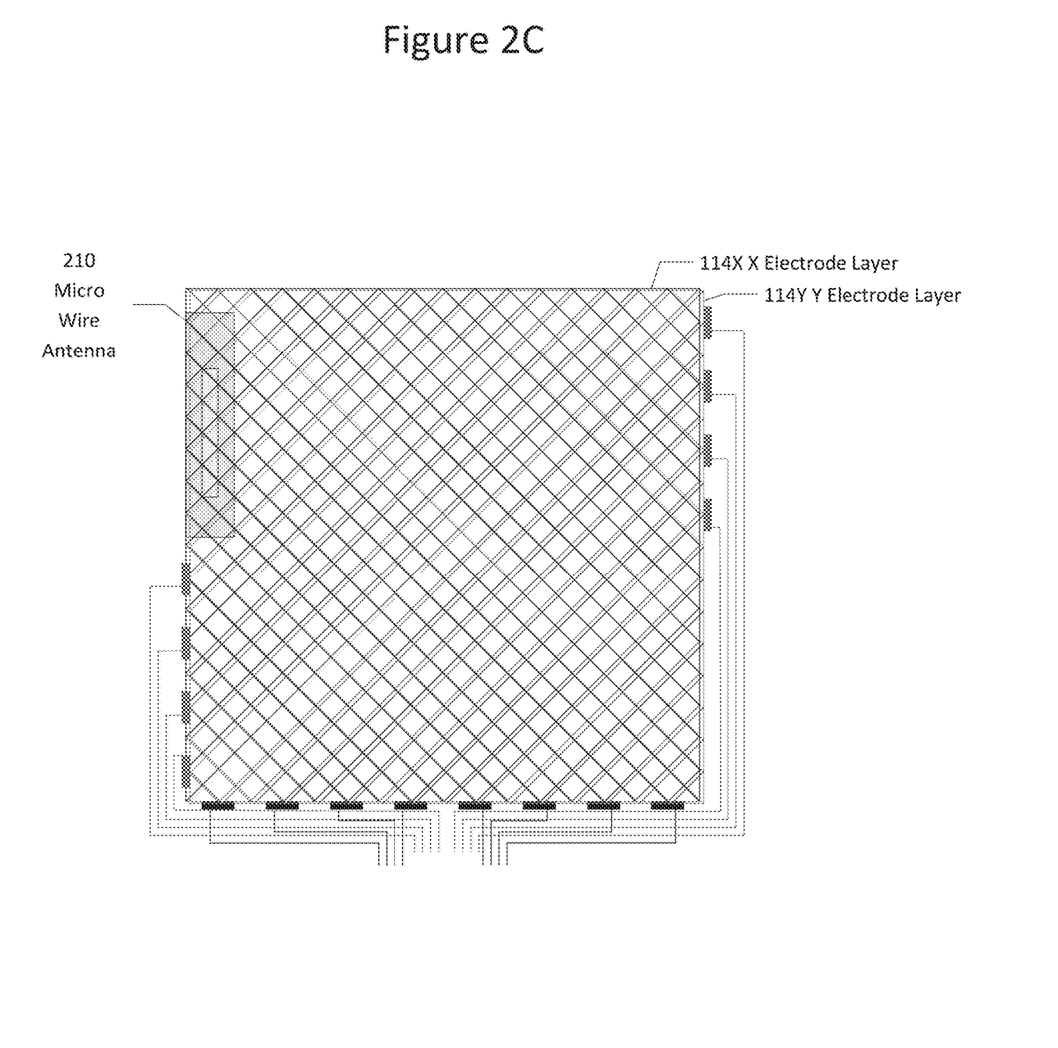
FIG. 2C illustrates a schematic plan view diagram of a touch sensor and micro wire antenna of any of FIGS. 1A-1C.

FIG. 2A illustrates a schematic plan view diagram of an X sensor layer 114AX of the touch sensor 114 of the touch panel display 100 of any of FIGS. 1A-1C. FIG. 2B illustrates a schematic plan view diagram of a Y sensor layer 114AY of the touch panel display 100 of any of FIGS. 1A-1C. FIG. 2C illustrates a schematic plan view diagram of a touch sensor 114 (114AX and 114AY) and micro wire antenna 210 of any of FIGS. 1A-1C. The micro wire antenna 210 is shown as covering only a portion of the touch sensor 114, though the disclosure is not limited in this respect. The micro wire antenna 210 may cover any portion of the touch sensor 114, including the entire surface area, based on transparency requirements. There is often a tradeoff between transparency and antenna performance.

The micro wire antenna 210 has a grid structure on a thin transparent film engineered to provide high conductivity integrated together with the touch sensor 114 in the touch panel display stack-up structure. The micro wire antenna 210 has any of a number of antenna geometries to be optimized for antenna performance but without significant visual impact or display transparency degradation. This eliminates the need for antennas to be placed in the bezel area, thus enabling bezel-less, edge to edge display solutions.

The micro wire antenna 210 is a metal mesh with conductors that are, for example, approximately 4 um wide, about 2-5 μm or up to 7 um in thickness, with about 100 um pitch, and in such a case, may have a 92% transparency. A pitch is defined as the distance between two mesh. The specific dimensions depend on manufacturing capabilities and transparency requirements. The patterning of the antenna design can be modified by trading between transparency and antenna performance.

The micro wire antenna may be comprised of copper. A sheet resistance of these touch films with about 7 μm copper thickness is as low as 0.003 Ω/square, which is smaller than that of ordinary Indium Tin Oxide (ITO) by four orders. Alternatively, the metal mesh may be any conductive material, such as silver. The metal mesh may alternatively be comprised of a hybrid material, for example, approximately 2 μm of silver, approximately 2 μm of copper, and approximately 3 μm of carbon nanotube for a thickness of approximately 7 μm.

Figure 3:
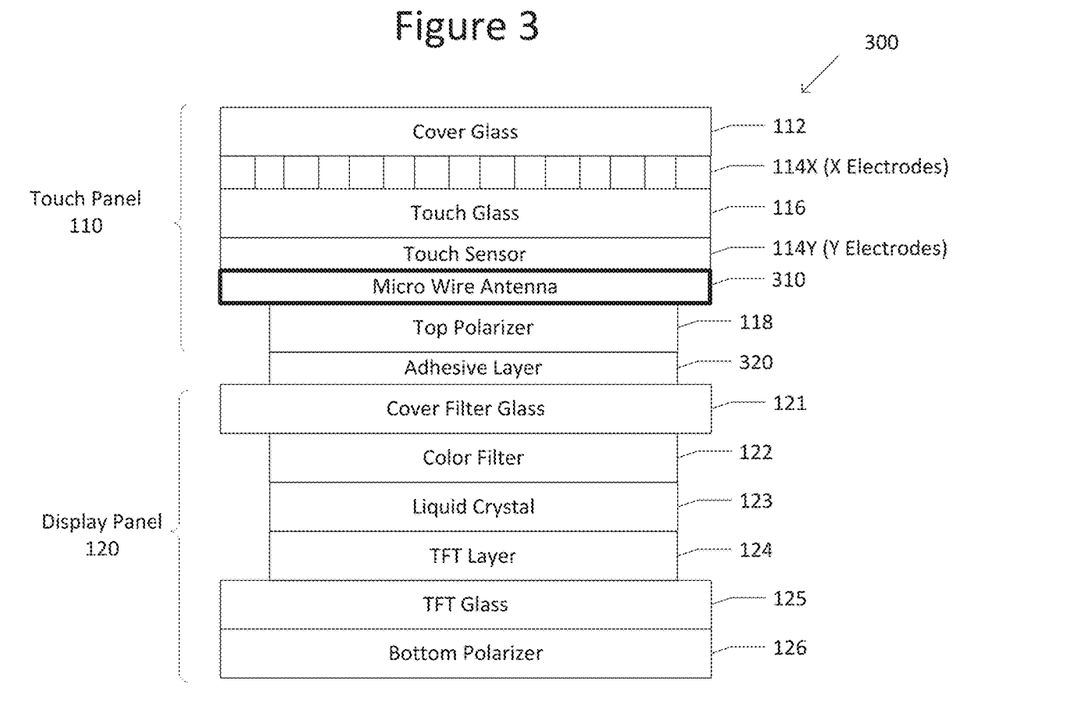
FIG. 3 illustrates a schematic side view diagram of a stack of components of a touch panel display in accordance with another aspect of the disclosure.

FIG. 3 illustrates a schematic side view diagram of a stack of components of a touch panel display 300 in accordance with another aspect of the disclosure. The touch panel display 300 of FIG. 3 is similar to that of FIG. 1A, except that the micro wire antenna 310 is located in a separate layer below the touch sensor 114 rather than in either or both of layer 114XA with the X electrodes and layer 114YA with the Y electrodes of the touch sensor 114. The micro wire antenna should have a separation layer between it and Y-sensor layer 114Y. This separation layer may be comprised of Polyethylene Terephthalate (PET).

The micro wire has been disclosed as being integrated in the touch sensor 114 in the X sensor layer 114X and/or the Y sensor layer 114Y. Alternatively, the micro wire has been disclosed as being located below the touch sensor 114. The disclosure is not limited in these respects. The micro wire antenna may be located at any position within the touch panel display as suitable for the intended purpose.

Figure 4A:
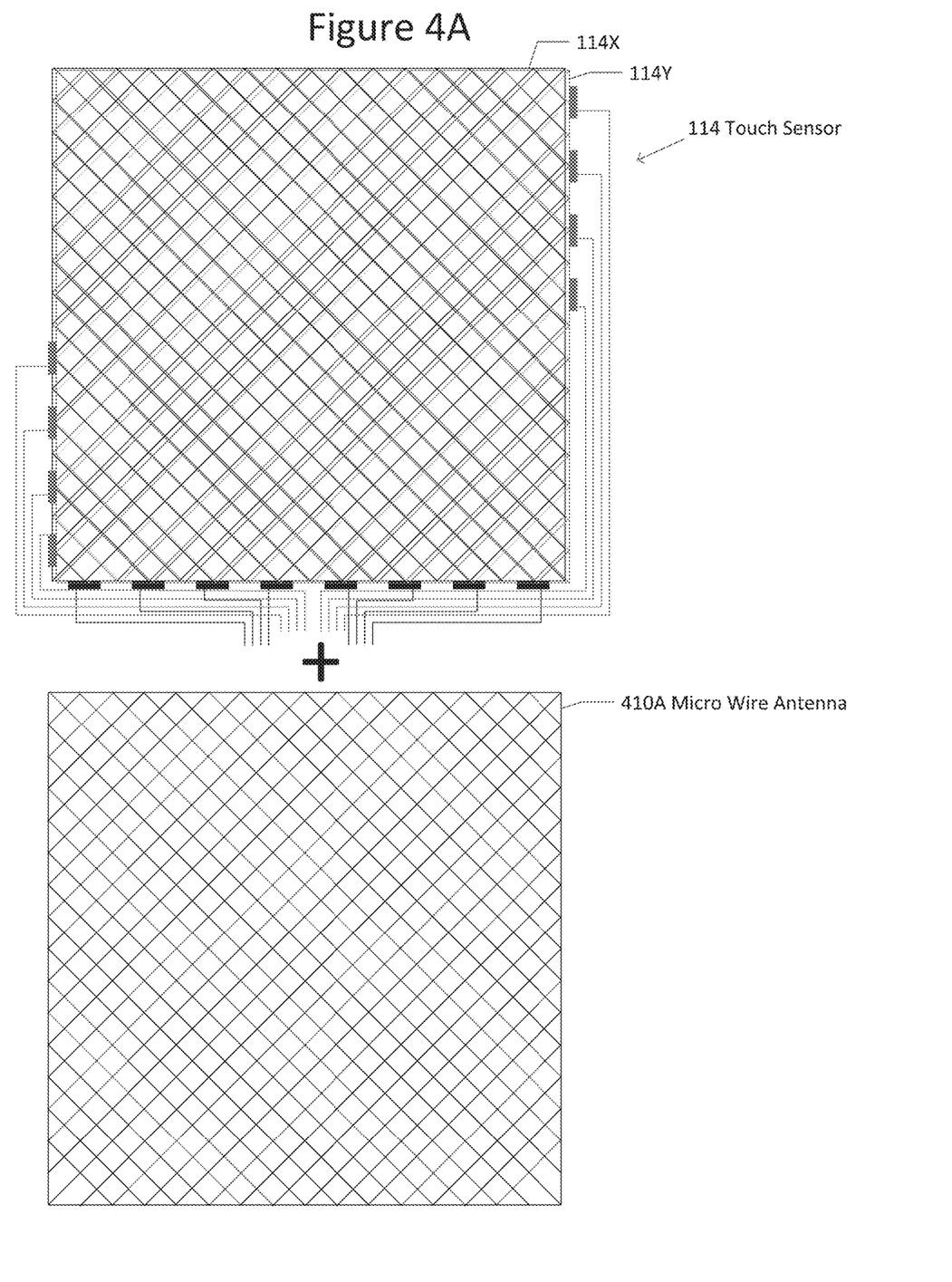
FIG. 4A illustrates a schematic plan view diagram of a touch sensor and a micro wire antenna of FIG. 3 in accordance with an aspect of the disclosure.

FIG. 4A illustrates a schematic plan view diagram of a touch sensor 114 (114X and 114Y) and a micro wire antenna 410A in accordance with an aspect of the disclosure. The micro wire antenna 410A is similar to the micro wire antenna 310 of FIG. 3 located below the touch sensor 114.

Figure 4B:
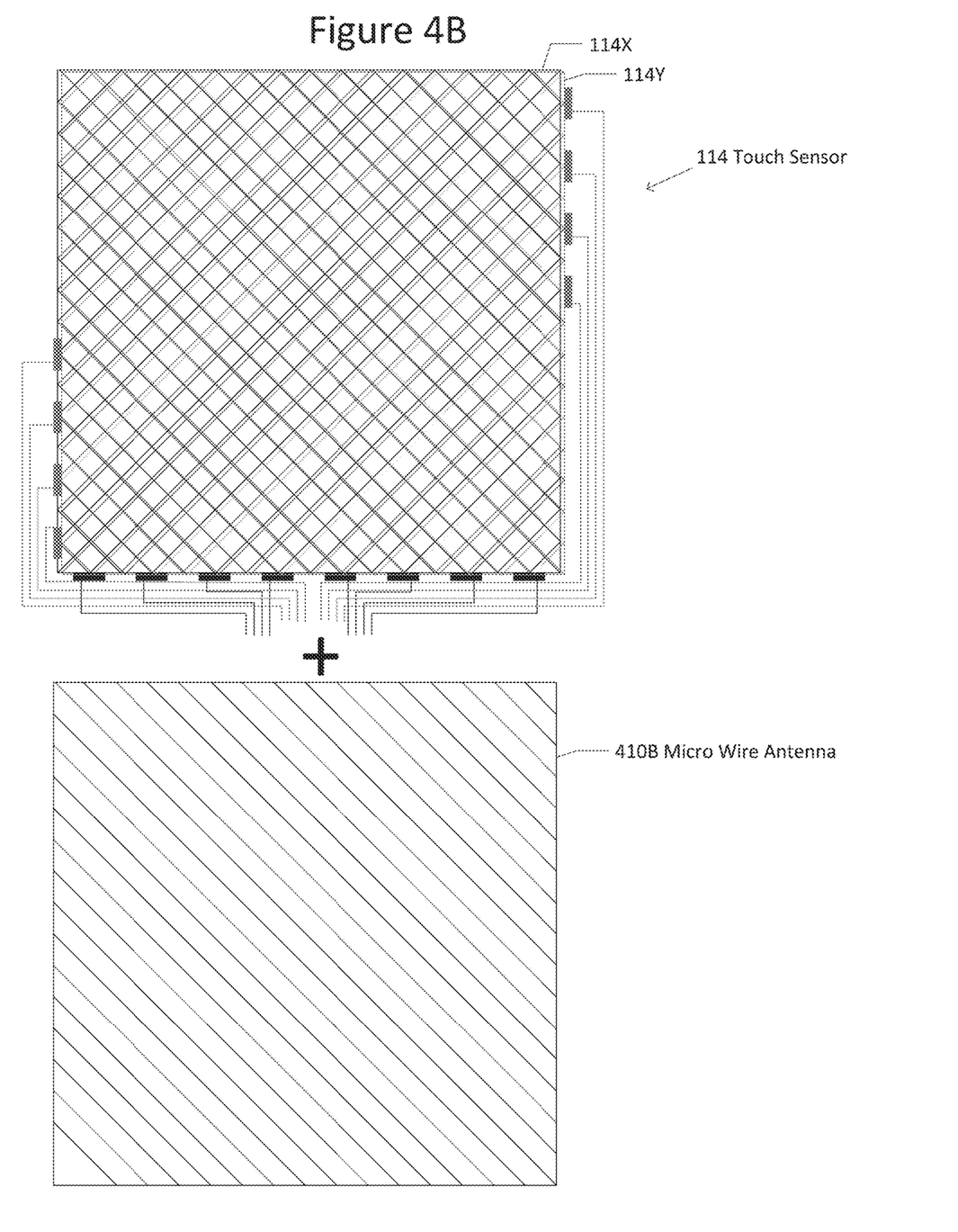
FIG. 4B illustrates a schematic plan view diagram of a touch sensor and a micro wire antenna of FIG. 3 in accordance with another aspect of the disclosure.

FIG. 4B illustrates a schematic plan view diagram of a touch sensor 114 (114X and 114Y) and a micro wire antenna 410B in accordance with another aspect of the disclosure. As with the micro wire antenna 410A of FIG. 4A, the micro wire antenna 410B is similar to the micro wire antenna 310 of FIG. 3, and is located below the touch sensor 114. However, in this case, the mesh wire has lines running all parallel to one another in one direction rather than perpendicular to one another in two directions. In fact, the mesh lines in any aspect of this disclosure may run in one direction, two directions, or any number of directions as suitable for the intended purpose.

FIGS. 5A-5E illustrate a touch panel in accordance with another aspect of the disclosure. By way of overview, the aspect illustrated by these figures differs from the previous aspects of the disclosure described above with respect to FIGS. 1-4 in that the antenna is located not within the touch sensor's active areas with the X and/or Y electrodes, but is instead located within dummy areas between electrodes. Also, the antenna is not necessarily comprised of micro wire, but may be comprised of an alternative material. A more detailed explanation follows.

Figure 5A:
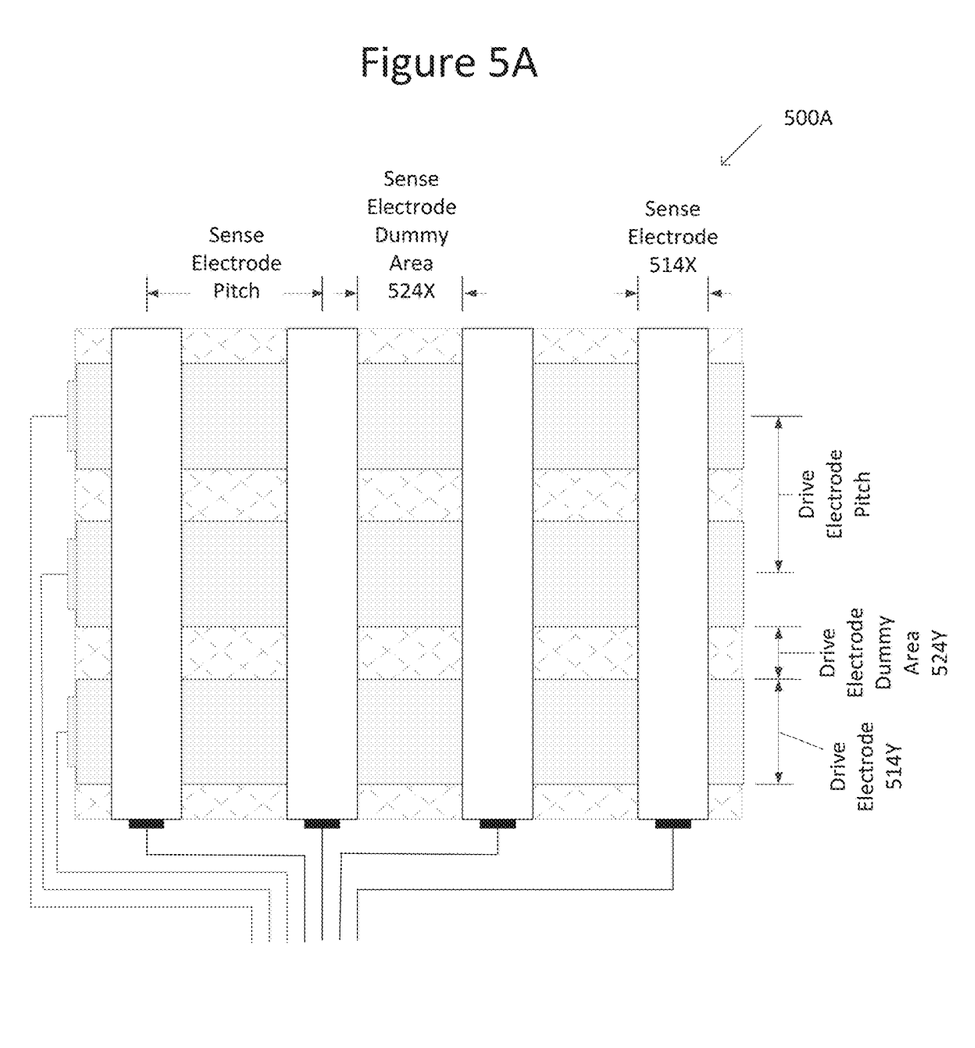
FIGS. 5A-5C illustrate schematic plan view diagrams of a portion of a touch panel display in accordance with another aspect of the disclosure.

FIG. 5A illustrates a schematic plan view diagram of a portion of a touch panel 500A.

The touch panel 500A comprises sense electrode columns 514X, sense electrode dummy areas 524X, drive electrode rows 514Y, and drive electrode dummy areas 524Y. The sense electrode columns 514X and drive electrode rows 514Y correspond to the sense electrode columns 114X and drive electrode rows 114Y, respectively, as discussed above with respect to FIGS. 1-4. Again, the electrode columns and rows may be more generally known as electrode traces. The sense electrode dummy areas 524X are located between the sense electrode columns 514X. Similarly, the drive electrode dummy areas 524Y are located between the drive electrode rows 514Y. The sense electrode dummy areas 524X and the drive electrode dummy areas 524Y are areas where there are no sense electrode columns 514X or drive electrode rows 514Y.

The distance between respective drive electrode rows 114Y can be referred to as drive electrode row pitch and the distance between respective sense electrode columns 114X can be referred to as sense electrode column pitch. The pitch can be dependent on a target diameter of the touching object (e.g., a finger, stylus, etc.). The pitch can be, for example, about 5 mm for finger touch. For the purpose of this discussion, the areas between respective drive electrode rows 514Y and also between the sense electrode columns 514X can be referred to as "dummy areas." For example, there are sense electrode dummy areas between adjacent sense electrode columns 514X, and drive electrode dummy areas between adjacent drive electrode rows 514Y.

The width of the electrodes—drive electrode rows 514Y and sense electrode columns 514X—can be based on the integrated circuit manufacturing requirements and/or tolerances, and can be, for example, approximately 1.6 mm. In this example, the width of the dummy areas can be, for example, about 3.4 mm. These widths are provided for exemplary purposes and the embodiments are not limited to these values.

One or more antennas can be placed within the dummy areas (e.g., sense electrode dummy areas 524X and/or the drive electrode dummy areas 524Y). For example, one or more conductive materials for antenna patterning can be formed within one or more of the dummy areas. The materials for the antenna patterning can include, for example, indium tin oxide (ITO) transparent conductor, micro wire metal mesh, and/or one or more other materials as would be understood by those skilled in the relevant arts. The materials can be the same or different as those used for the touch sensor layers. Further, the materials can be transparent, semi-transparent, or opaque. In an exemplary embodiment, by forming the antenna(s) in one or more dummy areas, the antenna can be placed directly on to the sensor layer patterns.

Figure 5B:
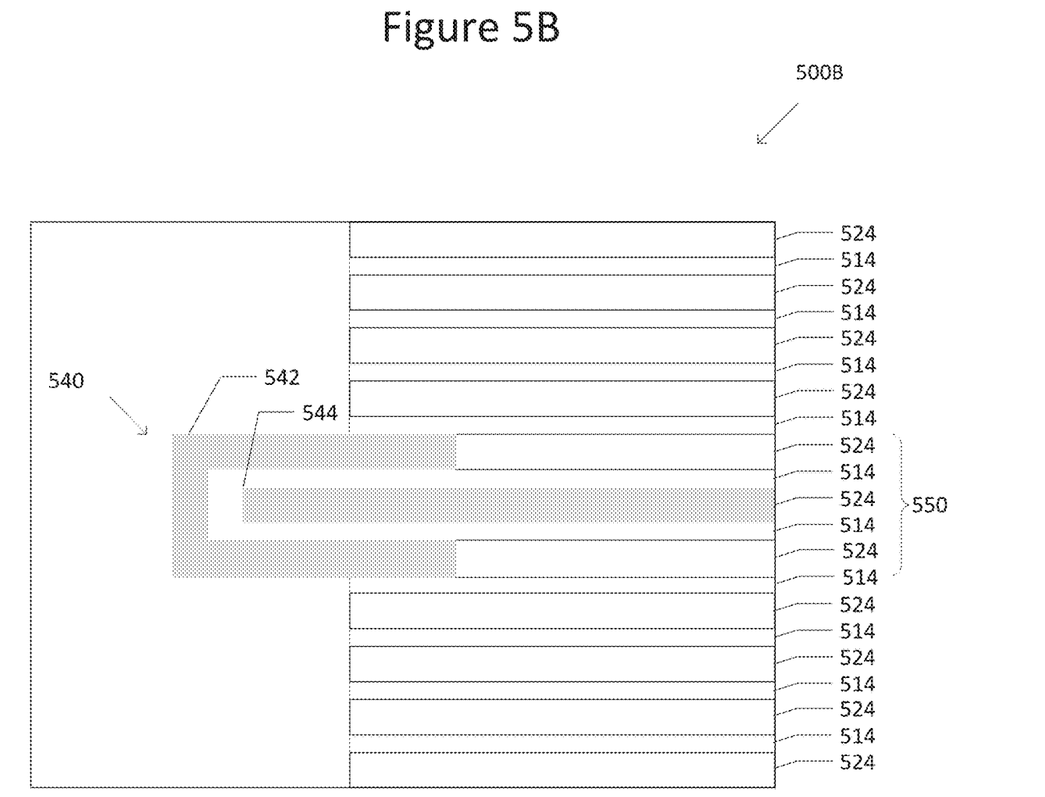

FIG. 5B illustrates another schematic plan view diagram of a portion of the touch panel of FIG. 5A.

The touch panel 500B comprises sense/drive electrodes 514 and dummy areas 524 disposed between adjacent electrodes 514 (drive electrode 514Y or sense electrodes 514X). An antenna 540 is located in the dummy areas 524 within section 550. The antenna 540 comprises an antenna driver 542 configured to drive a monopole antenna 544. The disclosure is not limited to a single antenna, but may include any number of antennas as suitable. Also, the antenna need not be a monopole antenna, but may be any suitable antenna, similar to the antennas described above with respect to the aspects of FIGS. 1-4.

The dummy areas 524 can include one or more materials, including, for example, indium tin oxide (ITO) transparent conductor, micro wire metal mesh, and/or one or more other materials as would be understood by those skilled in the relevant art. In some examples, the materials within the dummy areas 524 can be the same as those used for the one or more antennas 540. By using the same materials, uniformity in the display can be achieved. Although not illustrated, the remaining portion of the dummy area 524 in which the antenna 540 is located can also include the same or different materials as those dummy areas 524 not including an antenna 540.

Figure 5C:
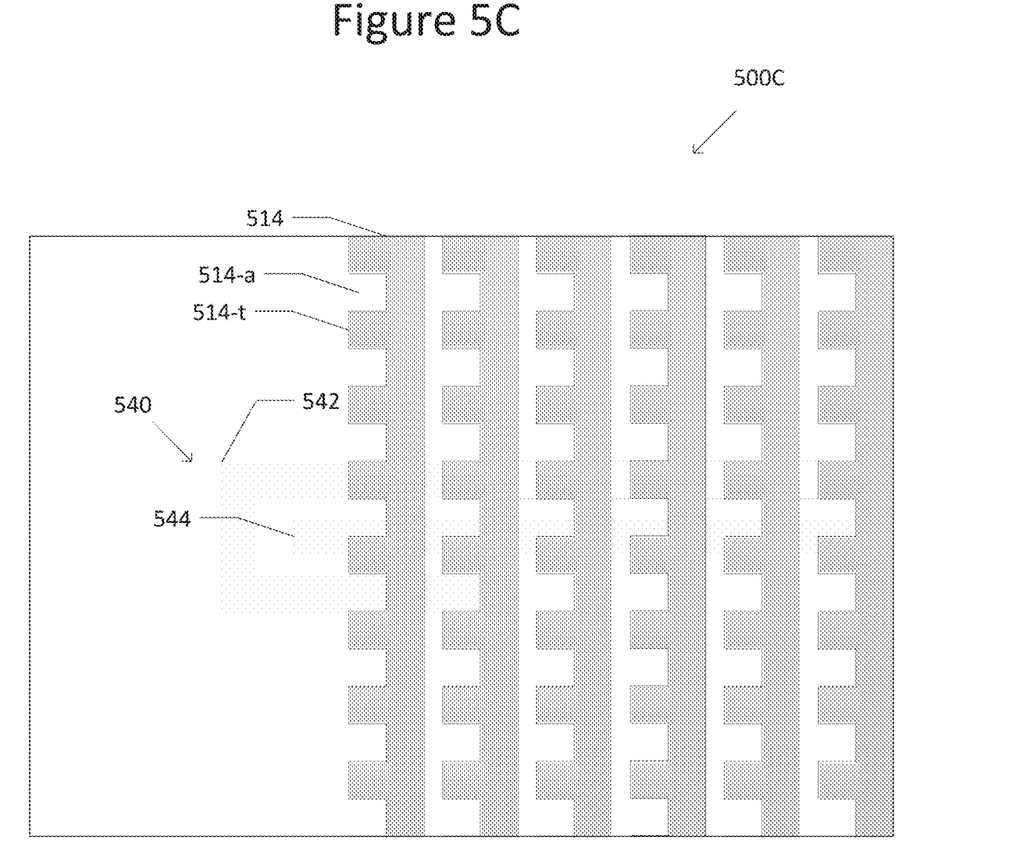

FIG. 5C illustrates another schematic plan view diagram of the touch panel of FIG. 5A. The touch panel 500C shown in FIG. 5C illustrates the other of the sense/drive electrodes 514 shown in FIG. 5B. The antenna 540 described with respect to FIG. 5B is illustrated merely for the sake of perspective.

The sense/drive electrode 514 can include a toothed-structure having one or more teeth 514-t located on one or more sides of the sense/drive electrode 514. The toothed-structure can create apertures 514-a between adjacent teeth 514-t to improve the antenna efficiency of one more antennas located within the dummy areas. The sense/drive electrode 514 is not limited to the toothed-structure and can be another shape as would be understood by those skilled in the relevant art. Also, the antenna 540 may be located within the dummy areas 524 of the sense electrodes 514X and/or drive electrodes 514Y.

Figure 6A:
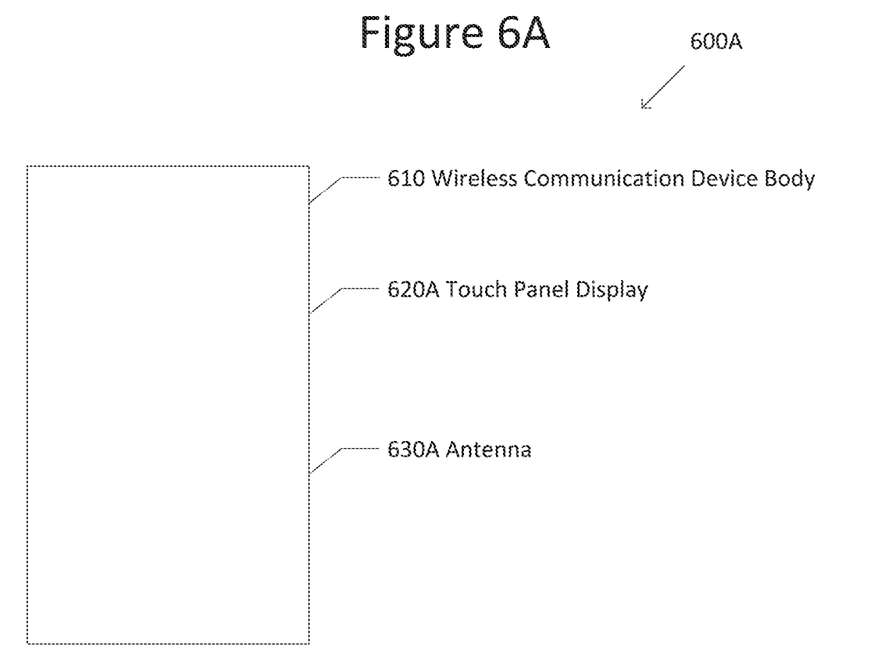
FIG. 6A illustrates a schematic diagram of a wireless communication device in accordance with an aspect of the disclosure.

FIG. 6A illustrates a schematic diagram of a wireless communication device 600A in accordance with an aspect of the disclosure. The wireless communication device 600A comprises a wireless communication device body 610, a touch panel display 620A, and an antenna 630A. As can be seen, the touch panel display 620A extends across the entire surface area of the wireless communication device 600A, as does the antenna 630A. The wireless communication device 600A may be any wireless communication device, including but not limited to a mobile device—such as a laptop computer, a tablet computer, a mobile telephone or smartphone, a "phablet," a personal digital assistant (PDA), and the like; and a wearable computing device—such as a computerized wrist watch or "smart" watch, computerized eyeglasses, and the like. The touch panel display 620A and antenna 630A may alternatively be implemented in a stationary device, including but not limited to a personal computer (PC), a desktop computer, a computerized kiosk, an automotive/aeronautical/maritime in-dash computer terminal, and the like.

Figure 6B:
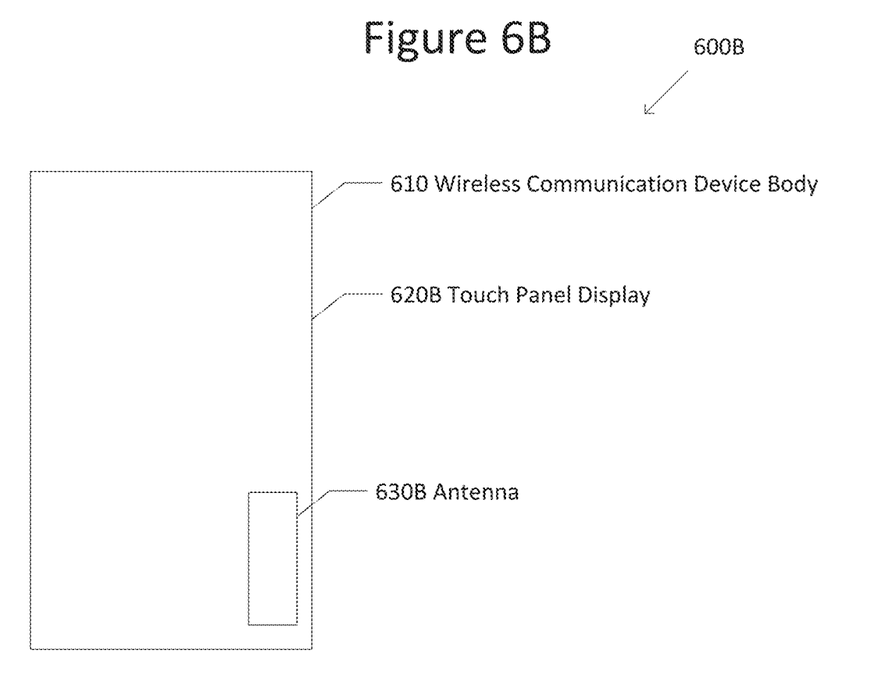
FIG. 6B illustrates a schematic diagram of a wireless communication device in accordance with another aspect of the disclosure.

FIG. 6B illustrates a schematic diagram of a wireless communication device 600B in accordance with another aspect of the disclosure. The wireless communication device 600B is similar to the wireless communication device 600A of FIG. 6A, except that rather than the antenna 630B extending across the entire surface area of the wireless communication device 600B, it extends across only a portion of the surface area.

Further, there may be more than one antenna 630B for different respective frequencies. Such multiple antennas should be placed in separate areas to avoid interference with one another.

Figure 7A:
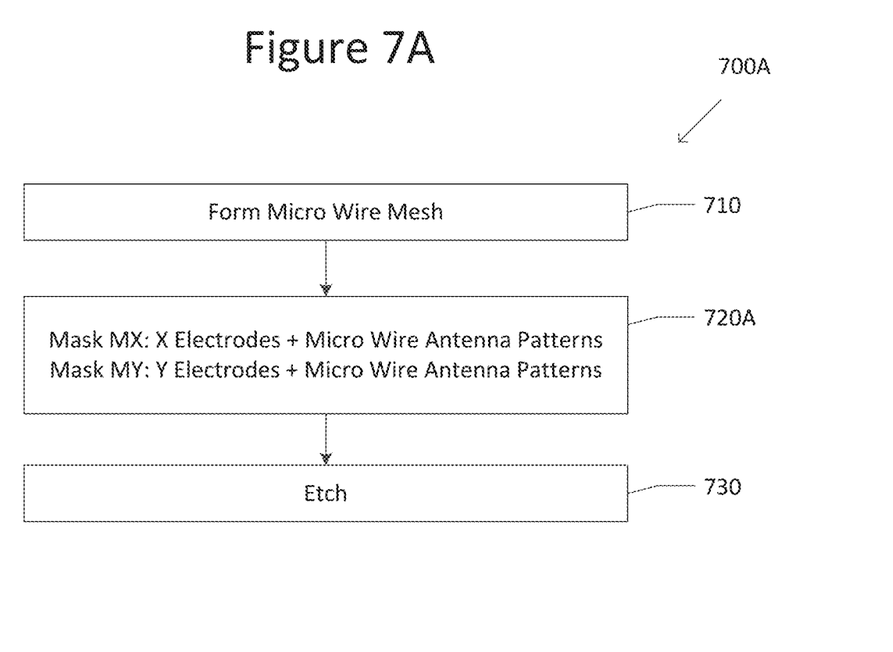
FIG. 7A illustrates a flowchart of a method of forming the touch sensor of FIGS. 1A-1C.

FIG. 7A illustrates a flowchart of a method 700A of forming the touch sensor 114 and antenna of FIGS. 1A-1C.

At Step 710, Step 710, a micro wire mesh is formed based on the touch sensor transparency and sensitivity requirements.

At Step 720A, a mask MX is formed with the micro wire antenna patterns and the X electrodes 114X which coexist. Similarly, a mask MY is formed with the micro wire antenna patterns and the Y electrodes 114Y which coexist.

At Step 730, the masks MX and MY are etched.

Figure 7B:
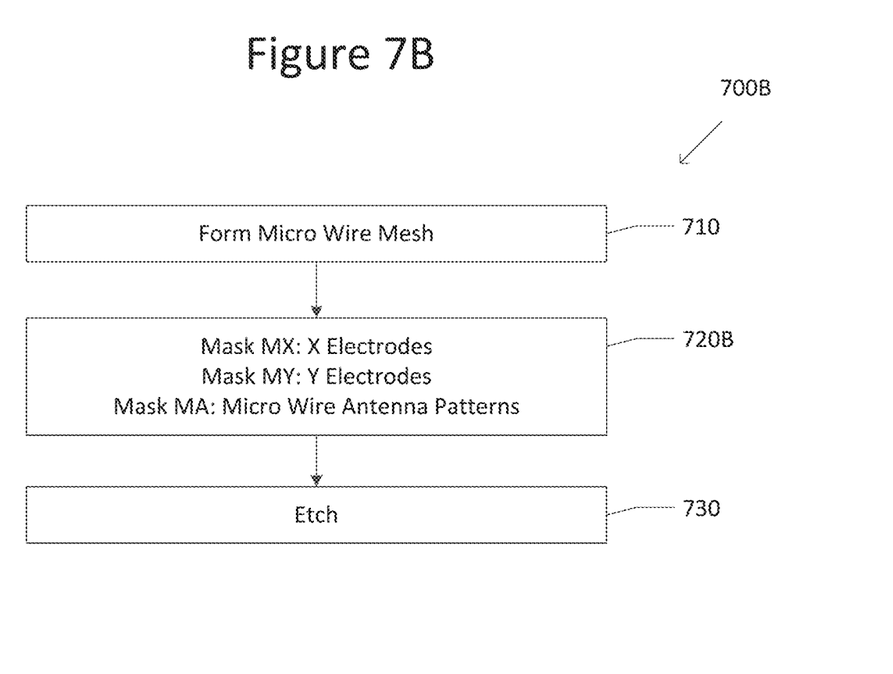
FIG. 7B illustrates a flowchart of a method of forming the touch sensor of FIG. 3.

FIG. 7B illustrates a flowchart of a method 700B of forming the touch sensor 114 and micro wire antenna 310 of FIG. 3.

At Step 710, a micro wire mesh is formed.

At Step 720B, a mask MX is formed with the X electrodes 114X, and a mask MY is formed with the Y electrodes. Similarly, a mask MA is formed with the micro wire antenna patterns.

At Step 730, the mask MX, mask MY, and mask MA are etched.

The antennas as disclosed herein achieve comparable performance to existing antennas without compromising the display optical properties.

Example 1 is a touch panel for a display, the touch panel comprising: a touch sensor configured to receive touch input; and a micro wire antenna located within or below the touch sensor.

In Example 2, the subject matter of Example 1, wherein the micro wire antenna is located within the touch sensor.

In Example 3, the subject matter of Example 2, wherein the touch sensor comprises a first portion located in a first layer, and a second portion located in a second layer.

In Example 4, the subject matter of Example 3, wherein the micro wire antenna is located in the first layer.

In Example 5, the subject matter of Example 4, wherein the micro wire antenna is a slot antenna.

In Example 6, the subject matter of Example 3, wherein the micro wire antenna is located in the second layer.

In Example 7, the subject matter of Example 6, wherein the micro wire antenna is a slot antenna.

In Example 8, the subject matter of Example 3, wherein the micro wire antenna is located in both the first layer and the second layer.

In Example 9, the subject matter of Example 8, wherein the micro wire antenna is a patch antenna.

In Example 10, the subject matter of Example 2, wherein the micro wire antenna is located in a layer below the touch sensor.

In Example 11, the subject matter of Example 1, wherein the micro wire antenna comprises a copper mesh.

In Example 12, the subject matter of Example 1, further comprising a plurality of micro wire antennas.

In Example 13, the subject matter of Example 1, wherein the micro wire antenna has a surface area that is substantially the same as the surface area of the touch panel display.

In Example 14, the subject matter of Example 1, wherein the micro wire antenna has a surface area that is less than the surface area of the touch panel display.

Example 15 is a wireless communication device comprising the subject matter of Example 1.

Example 16 is a touch panel for a display, the touch panel comprising: a touch sensor comprising a plurality of electrode traces; at least one dummy area disposed between adjacent electrode traces of the plurality of electrode traces; and an antenna disposed in the at least one dummy area.

In Example 17, the subject matter of Example 16, wherein the at least one dummy area comprises indium tin oxide (ITO) or a micro wire metal mesh.

In Example 18, the subject matter of Example 16, wherein the antenna comprises indium tin oxide (ITO) or micro wire metal mesh.

In Example 19, the subject matter of Example 16, wherein the at least one dummy area and the antenna comprise a same transparent conductive material.

In Example 20, the subject matter of Example 16, wherein at least one of the plurality of electrode traces has a toothed-shaped structure.

Example 21 is a wireless communication device comprising the subject matter of Example 16.

In Example 22, the subject matter of Example 21, further comprising a display panel located below the touch panel.

Example 23 is a method of forming a touch panel for a display, the method comprising: forming a micro wire mesh within or below a touch sensor of the touch panel; masking the micro wire mesh and touch sensor; and etching the micro wire mesh and touch sensor.

In Example 24, the subject matter of Example 23, wherein the masking comprises masking with a first mask the touch sensor.

In Example 25, the subject matter of Example 24, wherein the masking comprises masking with a second mask the micro wire mesh.

In Example 26, the subject matter of any of Examples 1-4, wherein the micro wire antenna is a slot antenna.

In Example 27, the subject matter of any of Examples 1-6, wherein the micro wire antenna is a slot antenna.

In Example 28, the subject matter of any of Examples 1-8, wherein the micro wire antenna is a patch antenna.

In Example 29, the subject matter of any of Examples 1-10, wherein the micro wire antenna comprises a copper mesh.

In Example 30, the subject matter of any of Examples 1-11, further comprising a plurality of micro wire antennas.

In Example 31, the subject matter of any of Examples 1-12, wherein the micro wire antenna has a surface area that is substantially the same as the surface area of the touch panel display.

In Example 32, the subject matter of any of Examples 1-12, wherein the micro wire antenna has a surface area that is less than the surface area of the touch panel display.

Example 33 is a wireless communication device comprising the subject matter of any of Examples 1-16.

In Example 34, the subject matter of any of Examples 16-17, wherein the antenna comprises indium tin oxide (ITO) or micro wire metal mesh.

In Example 35, the subject matter of any of Examples 16-18, wherein the at least one dummy area and the antenna comprise a same transparent conductive material.

In Example 36, the subject matter of any of Examples 16-19, wherein at least one of the plurality of electrode traces has a toothed-shaped structure.

Example 37 is a wireless communication device comprising the subject matter of any of Examples 16-20.

Example 38 is an apparatus substantially as shown and described.

Example 39 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A touch panel for a display, the touch panel comprising:
   a touch sensor configured to receive touch input, and comprising a first portion disposed in a first layer, and a second portion disposed in a second layer, the first layer and the second layer each including a plurality of adjacent electrodes; and
   a micro wire mesh antenna disposed in at least one of the first layer or the second layer in one or more spaces between the plurality of adjacent electrodes, and
   wherein at least one of the plurality of adjacent electrodes included in the first layer and the second layer has a continuous meandering path forming a structure that is configured to improve an antenna efficiency associated with the micro wire mesh antenna, and
   wherein the continuous meandering path forming the structure of the at least one of the plurality of adjacent electrodes includes a plurality of right angles at periodic intervals along the continuous meandering path, wherein the plurality of right angles at periodic intervals included in the continuous meandering path form a plurality of adjacent teeth as part of a toothed structure, and wherein each of the plurality of adjacent teeth forms a respective one of a plurality of apertures to improve the antenna efficiency associated with the micro wire mesh antenna.

2. The touch panel of claim 1, wherein the micro wire mesh antenna is a slot antenna.

3. The touch panel of claim 1, wherein the micro wire mesh antenna is a patch antenna.

4. The touch panel of claim 1, wherein the micro wire mesh antenna comprises a copper mesh.

5. The touch panel of claim 1, further comprising a plurality of micro wire mesh antennas.

6. The touch panel of claim 1, wherein the micro wire mesh antenna comprises a smaller surface area than the surface area of the touch panel display.

7. A wireless communication device comprising the touch panel of claim 1.

8. The touch panel of claim 1, wherein the micro wire mesh antenna is disposed in both the first layer and the second layer.

9. The touch panel of claim 1, wherein the plurality of electrodes included within the first layer are sense electrodes associated with the touch panel, and wherein the plurality of electrodes included within the second layer are drive electrodes associated with the touch panel.

10. The touch panel of claim 1, wherein the micro wire mesh antenna is comprised of a mesh with individual conductors made of a hybrid material.

11. The touch panel of claim 10, wherein the hybrid material comprises (i) silver, (ii) copper, and (iii) carbon nanotubes.

12. The touch panel of claim 1, wherein the micro wire mesh antenna includes a driver and an antenna element, the driver being configured to drive the antenna element, and wherein each of the driver and the antenna element are disposed in at least one of the first layer or the second layer in one or more spaces between the plurality of adjacent electrodes.

13. The touch panel of claim 12, wherein the antenna element is a monopole antenna.

14. The touch panel of claim 1, wherein the micro wire mesh antenna is disposed in the space between the plurality of adjacent electrodes within the first layer and the second layer.

15. The touch panel of claim 14, wherein the micro wire mesh antenna forms a patch antenna having portions of the patch antenna occupying the first layer and the second layer of the touch panel.

16. The touch panel of claim 1, wherein the micro wire mesh antenna has a substantially two-dimensional structure.

17. The touch panel of claim 1, wherein the micro wire mesh antenna is comprised of individual conductors having a pitch such that the micro wire mesh antenna is substantially transparent.

18. The touch panel of claim 17, wherein the micro wire mesh antenna is comprised of individual conductors having a pitch such that the micro wire mesh antenna has a transparency of 92%.

19. The touch panel of claim 1, wherein the micro wire mesh antenna is formed from a same material as the plurality of adjacent electrodes in the first layer and the second layer.

* * * * *